United States Patent
Ijzerman

(10) Patent No.: US 7,789,536 B2
(45) Date of Patent: Sep. 7, 2010

(54) LIGHTING DEVICE

(75) Inventor: Willem Lubertus Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 175 days.

(21) Appl. No.: 12/093,722

(22) PCT Filed: Nov. 9, 2006

(86) PCT No.: PCT/IB2006/054179

§ 371 (c)(1),
(2), (4) Date: May 15, 2008

(87) PCT Pub. No.: WO2007/057821

PCT Pub. Date: May 24, 2007

(65) Prior Publication Data

US 2008/0285275 A1    Nov. 20, 2008

(30) Foreign Application Priority Data

Nov. 21, 2005   (EP)   .................................. 05110994

(51) Int. Cl.
    *F21F 3/00*       (2006.01)
(52) U.S. Cl. ............................ 362/311.01; 362/311.12; 362/241; 362/346; 362/517
(58) Field of Classification Search .................. 362/311, 362/517, 518, 241, 346, 311.01, 311.1
See application file for complete search history.

(56) References Cited

U.S. PATENT DOCUMENTS

| 4,254,453 | A  | * | 3/1981  | Mouyard et al. ............. 362/240 |
| 4,767,172 | A  | * | 8/1988  | Nichols et al. ............... 385/146 |
| 5,130,897 | A  | * | 7/1992  | Kuzma ......................... 362/24 |
| 5,396,406 | A  |   | 3/1995  | Ketchpel |
| 6,554,451 | B1 |   | 4/2003  | Keuper |
| 6,813,024 | B2 | * | 11/2004 | Kramer et al. ............... 356/416 |
| 2005/0219840 | A1 | | 10/2005 | Holder et al. |

FOREIGN PATENT DOCUMENTS

| DE | 10124370 A1 | 11/2002 |
| EP |  1030099 A2 |  8/2000 |

* cited by examiner

Primary Examiner—Jong-Suk (James) Lee
Assistant Examiner—Mark Tsidulko
(74) Attorney, Agent, or Firm—Mark L. Beloborodov

(57) ABSTRACT

The present invention relates to a lighting device in the form of a matrix illumination system, comprising a transparent carrier plate (11) provided with a plurality of LEDs (3, 5), arranged thereon. The LEDs may be arranged in a pattern with rows and columns and each LED may be optically connected to a collimating optical component (13, 15) in the form of an optical transparent body which collimates light generated by the respective light emitting diode by means of total internal reflection. In order to make the overall system transparent, so that objects behind the system may be visible therethrough, the space between the optical elements of the individual LEDs is filled with a filling material (29) that has a refractive index which is higher than the refractive index of air. A gap is maintained between the filling material and the surfaces of the optical components in order to maintain the TIR lens property.

8 Claims, 2 Drawing Sheets

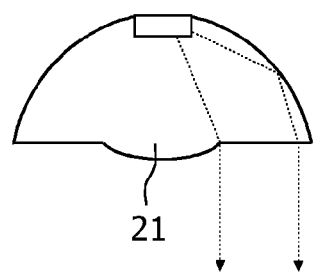
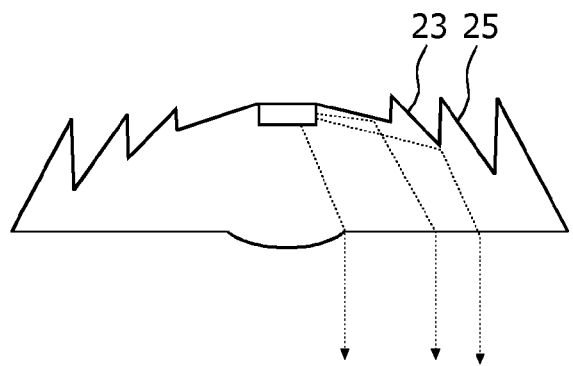
FIG. 4  FIG. 5
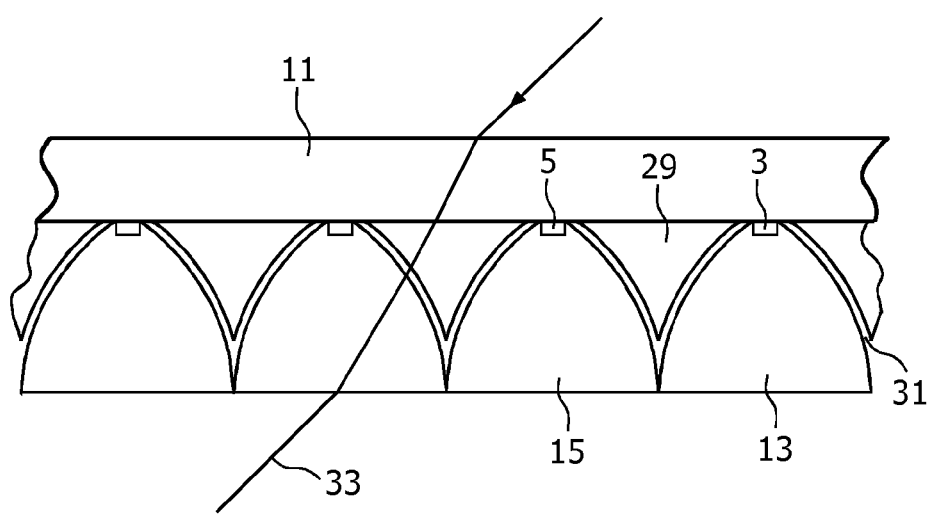
FIG. 6

008# LIGHTING DEVICE

The present invention relates to a lighting device comprising a substrate and a plurality of light emitting diodes arranged on said substrate each light emitting diode being optically connected to a collimating optical component.

Such a device is disclosed e.g. in U.S. Pat. No. 6,554,451, where the light emitting diodes are each provided with a collimating component in order to provide more accurate illumination at a distance from an illuminated object.

One disadvantage with this device is that it is not transparent, which would be a desirable property.

An object of the present invention is therefore to provide a lighting device of the kind mentioned in the opening paragraph, which is transparent, so that objects can be viewed through the device at angles different from the direction of illumination.

This object is achieved by means of a lighting device as defined in claim 1.

More specifically, the invention relates to a lighting device comprising a substrate and a plurality of light emitting diodes arranged on said substrate, each light emitting diode being optically connected to a collimating optical component in the form of an optical transparent body which collimates light generated by the respective light emitting diode by means of total internal reflection and having a refractive index higher than the refractive index of air (1.0), wherein the space between adjacent optical components is at least partly filled with a filling material that has a refractive index higher than the refractive index of air and wherein a gap is provided between each optical collimating component and the filling material. The filling material ensures that light rays traveling through the device in directions that are oblique, i.e. not perpendicular, to the substrate surface changes their direction of propagation to a lesser extent. The degree of transparency is therefore increased.

The gap width may be uniform over the optical collimating component surface, and the gap width is preferably at least 2 μm.

The refractive index of the collimating optical component and the refractive index of the filling material may be the same, and their mutual difference is preferably less than 0.3.

The collimating optical component may be a compound parabolic concentrator (CPC).

These and other aspects of the invention will be apparent from and elucidated with reference to the embodiments described hereinafter.

FIGS. 3-5 illustrate in cross-section different shapes of optical collimating components.

FIG. 6 shows a cross-section through a matrix illumination system according to one embodiment of the invention.

Figure 1:
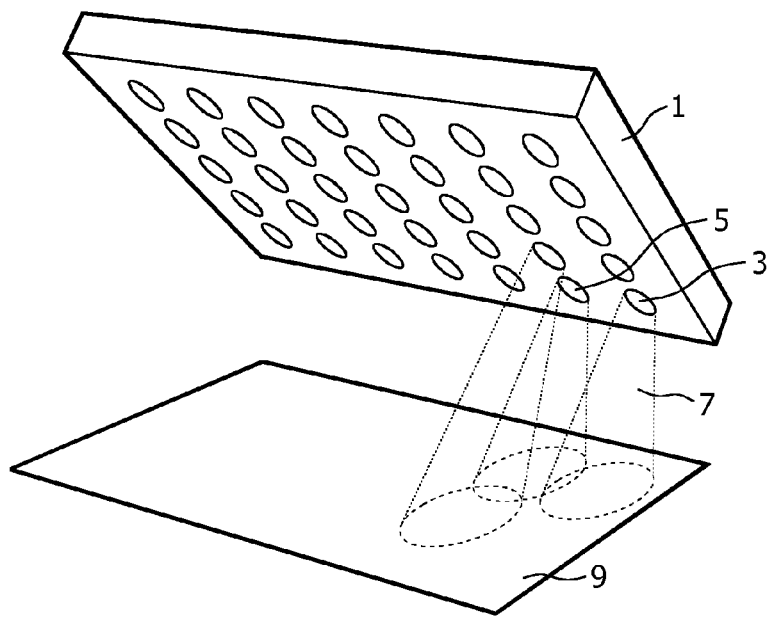
FIG. 1 illustrates schematically the use of a matrix illumination system.

FIG. 1 illustrates schematically the use of a matrix illumination system. The system comprises a carrier arrangement 1, in the form of a plate, with a plurality of light emitting diodes (LEDs) 3, 5, etc., arranged in a pattern on the carrier. The LEDs may be arranged in rows and columns as illustrated in FIG. 1, but other configurations are conceivable. The LEDs may e.g. be arranged in columns that are mutually offset, they may be arranged in concentric circles, or they may be arbitrarily or randomly placed on the carrier. As will be illustrated later, each LED may be optically connected to a collimating optical element or component, such that each combination of LED and collimating optical element emits a collimated light beam 7. The LEDs on the carrier may be used to illuminate a surface 9, and since each LED may be controlled separately, the illumination may be varied over this surface in many different ways.

Figure 2:
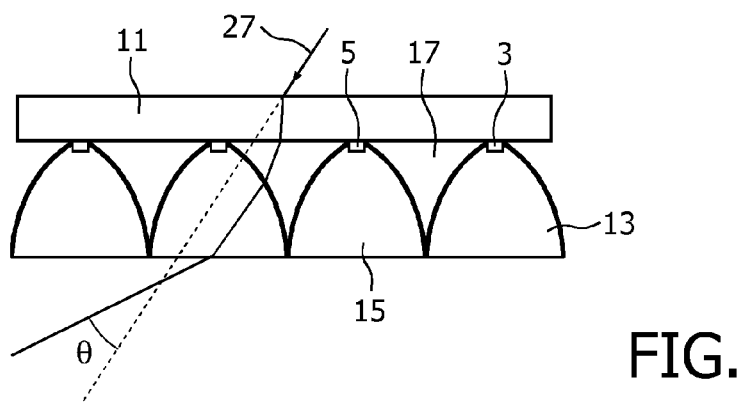
FIG. 2 shows a cross-section through a conventional matrix illumination system.

FIG. 2 shows a cross-section through a matrix illumination system. As mentioned, the system comprises a plurality of LEDs 3, 5, etc. arranged on a preferably planar carrier substrate 11 that may be made of a transparent material, e.g. transparent PMMA (Polymethylmethacrylate). If a transparent substrate is used, the LEDs may preferably be fed by means of transparent conductors (not shown) such as ITO (Indium Tin Oxide) conductors. In the illustrated system, each LED is provided with a collimating optical component 13, 15, etc., which in the illustrated case is a compound parabolic concentrator in the form of an optical transparent body which collimates light generated by the respective light emitting diode by means of total internal reflection and having a refractive index higher than the refractive index of air.

Figure 3:
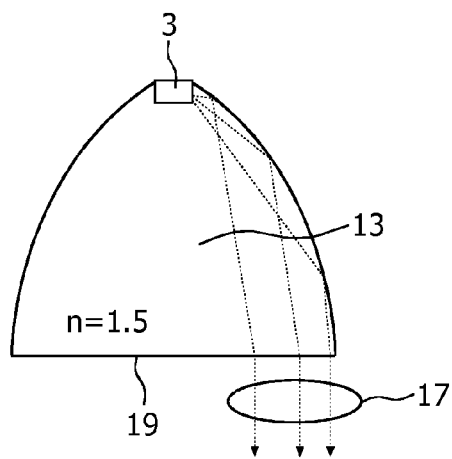

FIGS. 3-5 illustrate in cross-section different examples of collimating optical components. FIG. 3 illustrates a first example, a compound parabolic concentrator (sometimes referred to as a compound parabolic collimator) resembling a parabolic specular reflector. The CPC, however, comprises a solid body of a transparent material with a refractive index higher than air, e.g. 1.5. A major part of the light emitted by the LED in lateral directions is reflected at the interface between the CPC body and the surrounding air by total internal reflections (TIR). This light then exits the CPC at the front surface 19 perpendicularly to this surface as a collimated beam 7. Even though the word parabolic usually implies a cross section formed as a cone section, the cross section of a CPC may deviate from this shape to some extent. The LED 3 may be integrated with the collimating optical component 13.

FIG. 4 illustrates a second, somewhat flatter example in which an additional lens 21 is integrated in the front surface of the collimating optical component. FIG. 5 illustrates a third example in which the collimating optical element in addition to the front surface lens comprises circular, concentric prisms 23, 25, etc., which allow a collimating function similar to the one in FIG. 3, but with a considerably smaller optical element depth.

Returning to FIG. 2, if a transparent material carrier 11 as well as transparent material CPCs 13, 15 are used, and the LEDs 3, 5 are fed by transparent conductors (not shown), the overall system will be translucent, i.e. will allow light to passthrough it, save the small areas covered by the LEDs. However, light rays propagating in an oblique manner through the system will be refracted as illustrated by the exemplary light ray 27, i.e. the light ray will change its angle vis-à-vis the system with the difference angle θ. Therefore, the view through the system will be deteriorated, since the system has a lens function, scattering incoming light. The system will therefore not be transparent in the sense that objects behind the system are clearly visible through the system.

FIG. 6 shows a cross-section through a matrix illumination system according to one embodiment of the invention overcoming this problem. In this system the space between adjacent collimating optical components is filled with a filling material 29, e.g. in the form of an injection molded polymer plate, made of a transparent material.

The filling material has a refractive index higher than the refractive index of air. Preferably the refractive indices of the CPCs and the filling material are the same. However, even if there is some difference between the refractive indices, the situation will still in most cases be improved compared to the case where no filling material is used. The difference is preferably less than 0.3. This filling material may easily be adapted to the types of collimating optical components that are shown in FIGS. 4 and 5. The filling material 29 may also be an integral part of the substrate 11, i.e. be comprised by a structured surface on the latter.

In order to retain the function of the collimating optical components, a gap is maintained between each optical component 13, 15 and the filling material 29, so that total internal reflection of light emitted from the LED can take place. This gap may be uniform over the surfaces of the optical components. This gap should be at least a few times the longest light wavelength in order to avoid chromatic effects. A gap width of at least 2 μm is considered useful. Too large gaps may, however, reduce the positive effect of the filling material. The gap may be filled with air or another gas. Preferably a transparent cover plate is placed in front of the collimating optical components in order to avoid contamination of the gaps.

The effect of the filling material upon an oblique light ray 33 can be clearly seen in FIG. 6. The light ray will of course be refracted at each interface, but the angular property of the outgoing light ray will essentially be the same as when the light entered the carrier plate 11.

Note that this applies when looking through the system at an oblique angular position in relation to the system. When looking into the system in a perpendicular direction, a user sees the LEDs, whether light-emitting or not.

In summary, the invention relates to a lighting device in the form of a matrix illumination system, comprising a transparent carrier plate provided with a plurality of LEDs, arranged thereon. The LEDs may be arranged in a pattern with rows and columns and each LED may be optically connected to a collimating optical component in the form of an optical transparent body which collimates light generated by the respective light emitting diode by means of total internal reflection and having a refractive index higher than the refractive index of air. In order to make the overall system transparent, such that objects behind the system may be visible therethrough, the space between the optical elements of the individual LEDs is filled with a filling material that has a refractive index which is higher than the refractive index of air. A gap is maintained between the filling material and the surfaces of the optical components in order to maintain the TIR collimating property.

The invention is not restricted to the described embodiments. It can be altered in various ways within the scope of the appended claims.

The invention claimed is:

1. A lighting device comprising
a substantially optically transparent substrate,
a plurality of light emitting diodes arranged on said substrate,
a plurality of collimating optically transparent bodies defining a space therebetween, each optical transparent body being optically coupled to a respective light-emitting diode of the plurality of light-emitting diodes for collimating light emitted thereby by means of total internal reflection, each optical transparent body having a refractive index higher than the refractive index of air, and
an optically transparent filling material at least partially filling the space between the optical transparent bodies and having a refractive index higher than the refractive index of air, wherein collimating surfaces of said plurality of collimating optically transparent bodies are separated by a gap from said transparent filling material.

2. A lighting device according to claim 1, wherein the width of said gap is substantially uniform.

3. A lighting device according to claim 1, wherein the difference between the refractive index of said plurality of collimating optically transparent bodies and the refractive index of said transparent filling material is less than 0.3.

4. A lighting device according to claim 3, wherein the refractive index of said plurality of collimating optically transparent bodies and the refractive index of said optically transparent filling material is the same.

5. A lighting device according to claim 1, wherein the width of said gap is at least 2 μm.

6. A lighting device according to claim 1, wherein at least one of said plurality of collimating optically transparent bodies is a compound parabolic concentrator (CPC).

7. A lighting device according to claim 1, wherein said optically transparent filling material is an integral part of said substantially optically transparent substrate.

8. A lighting device according to claim 1, wherein said substantially optically transparent substrate comprises a plurality of substantially optically transparent conductors for connecting each of said plurality of light emitting diodes to a power source.

* * * * *